United States Patent
May

(10) Patent No.: US 12,522,718 B2
(45) Date of Patent: Jan. 13, 2026

(54) BIODEGRADABLE THERMOSETTING CHITOSAN-BASED POLYMERIZABLE COMPOSITION AND PROCESS OF USING SAME TO FORM A MOLD CASTED OBJECT

(71) Applicant: 1263349 ONTARIO INC., Trenton (CA)

(72) Inventor: Alexander Niall May, Belleville (CA)

(73) Assignee: 1263349 ONTARIO INC., Trenton (CA)

( * ) Notice: Subject to any disclaimer, the term of this patent is extended or adjusted under 35 U.S.C. 154(b) by 757 days.

(21) Appl. No.: 17/828,843

(22) Filed: May 31, 2022

(65) Prior Publication Data

US 2022/0411612 A1    Dec. 29, 2022

Related U.S. Application Data

(60) Provisional application No. 63/214,040, filed on Jun. 23, 2021.

(51) Int. Cl.
C08L 5/08      (2006.01)
C08L 97/02     (2006.01)

(52) U.S. Cl.
CPC ............... *C08L 5/08* (2013.01); *C08L 97/02* (2013.01); *C08L 2201/06* (2013.01); *C08L 2205/06* (2013.01)

(58) Field of Classification Search
None
See application file for complete search history.

(56) References Cited

U.S. PATENT DOCUMENTS 6,284,838 B1 *   9/2001   Silbiger ............... C08L 97/02
                                                      524/72

* cited by examiner

*Primary Examiner* — Michael Forrest
(74) *Attorney, Agent, or Firm* — MBM Intellectual Property Law LLP

(57) ABSTRACT

The present invention provides a chitosan-based composition that can be converted into a self-supporting casted object having good tensile and compressive strength that can also biodegrade at the end of its lifecycle. The composition comprises entirely bio-based or bio-sourced reagents that can be converted to the final product via a polymerization process that does not require the addition of inorganic catalysts, synthetic materials, or otherwise hazardous chemicals to strengthen or modify its water resistance.

20 Claims, 11 Drawing Sheets

BIODEGRADABLE THERMOSETTING CHITOSAN-BASED POLYMERIZABLE COMPOSITION AND PROCESS OF USING SAME TO FORM A MOLD CASTED OBJECT

FIELD OF THE INVENTION

The present invention pertains to the field of polymeric material, and in particular to chitosan-based thermosetting polymeric materials.

BACKGROUND

The use of chitosan as a structural material by itself provides materials suffering from a range of deficiencies. For example, materials produced upon drying a low-concentration chitosan solution results in a brittle material lacking flexural strength, and materials produced upon drying a high-concentration chitosan solution results in a material with massive shrinkage and warping. The chitosan materials can be chemically converted to chitin (to reduce solubility and increase strength), through the use of hazardous reagents, such as acid anhydrides, which would require additional processing to fully remove contaminants.

U.S. Pat. No. 5,900,479 (to Glasser et al.) discloses a process for producing an N-acyl glucose amine polymer using chitosan, heat and organic acids (in the example case, chitin is produced when acetic acid is used). While the aforementioned process produces a water insoluble polymer, the intermolecular amide bridges between chitosan molecular chains are necessarily limited in length to those formed by the organic acid used to dissolve the chitosan. These intermolecular bridges further reduce the distance between chains, shrinking the composite's final volume.

U.S. Patent Publication Number 2016/0296665 (to Ingber and Fernandez) describes a method for producing a laminate composite with chitosan or chitin and protein as layer components contained therein. This process necessarily includes a protein component, which is integrated into the laminar sheets to reinforce the chitosan component. The example protein used in this process is silk fibroin, which must be harvested and extracted from an animal source or from a genetically-engineered organism modified to produce it.

U.S. Pat. No. 5,821,285 (to Khor et al.) discloses the process of making a chitin-hydroxyapatite composite material. This process requires the use of a toxic solvent solution (LiCl in N,N-dimethylacetamide) to dissolve and cast the aforementioned composite material.

U.S. Patent Publication Number 2014/0242870 (to Hwang et al.) discloses an invention of a chitin/chitosan-composite crosslinked with a catechol-based molecule. Use of this catechol is necessarily required for production of these composites.

The use of a glycerol-polyacid biopolyester foam as a structural material by itself also provides material suffering from a number of deficiencies, including inconsistent surface roughness, i.e., mold-facing surfaces are porous while surfaces that are exposed to air are smooth. In addition, inconsistent bubbling and different-sized air pockets can be formed during curing. The initial mixture in a biopolyester system, which can also be difficult to handle, does not conform/attach consistently to mold surfaces (e.g., it can be runny during pre-polymerization steps, but quickly becomes tacky as polymerization proceeds). The final foam material can also have areas that stick excessively to parts of the mold, potentially leading to damage of the casted surface and mold when removing. Finally, biopolyester systems are known to exhibit massive expansion of the resulting foam during curing.

According to U.S. Patent Publication Number 2015/0005403 (to Rothenberg and Alberts), which describes a process for manufacturing a glycerol-tricarboxylic acid polyester foam, an increase in foam density occurs near the top of the cast, forming a surface coat thereon. However, there is no known method in the art for producing a higher density surface at the base of the foam (mold-facing), nor a way to improve the surface detail that may be required for some foam object applications.

U.S. Patent Publication Number 2018/0171090 (to Savonnet and Obert) discloses a process for creating a polyester foam composed of glycerol or related compounds with a polyacid. This process requires surfactants and a catalyst to produce the foam, either of which may have negative impacts on human health or on the environment depending on their chemical nature.

U.S. Pat. No. 8,524,855 (to Tisserat et al.) discloses a method for the production of polyol-carboxylic acid polyesters using microwave-based heating. The requirement of such a heating method may restrict some aspects of the final foam dimensions and/or molds used for their production. Additionally, due to the varied wavelengths used for heating, there can be uneven polymerization in the material, necessitating an additional curing step. The method provided by Tisserat et al. provides information on the longevity of such foams, of up to a year without degradation at room temperature.

Therefore there is a need for a bio-based structural material that can create a solid casted object with good tensile and compressive strength that can also biodegrade at the end of its lifecycle.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a biodegradable thermosetting chitosan-based polymerizable composition and process of using same to form a mold casted object. In accordance with an aspect of the present invention, there is provided a composition for use in preparing a thermoset mold-casted object, the composition comprising: chitosan; powdered lignocellulosic material; polycarboxylic acid; polyol; an organic acid component; and water.

In accordance with one embodiment, the composition comprises: from about 0.9 to about 1.1 parts chitosan; from about 0.9 to about 1.1 parts powdered lignocellulosic material; from about 1.75 to about 2.25 parts polycarboxylic acid; from about 0.75 to about 1.25 parts polyol; from about 1.3 to about 1.9 parts of an organic acid component; and from about 1 to about 2 parts water.

In accordance with another aspect of the present invention, there is provided a process for preparing a thermoset mold-casted object, comprising the steps of providing a mixture comprising chitosan, powdered lignocellulosic material, polycarboxylic acid, and polyol; stirring the mixture until a paste is formed; adding distilled water, and an organic acid component to the paste mixture; stirring the resulting mixture until combined to form an uncured composite mixture as a sticky paste; placing the uncured composite mixture into a mold; and curing the molded composite mixture in an oven at a temperature of about 160° C. to about 185° C. for a time sufficient to form the thermoset mold-casted object.

In accordance with one embodiment, the process for preparing a thermoset mold-casted object comprises the steps of providing a mixture comprising from about 0.9 to about 1.1 parts chitosan, from about 0.9 to about 1.1 parts powdered lignocellulosic material, from about 1.75 to about 2.25 parts polycarboxylic acid, and from about 0.75 to about 1.25 parts polyol; stirring the mixture until a paste is formed; adding from about 1 to about 2 parts distilled water, and from about 1.3 to about 1.9 parts of an organic acid component to the paste mixture; stirring the resulting mixture until combined to form an uncured composite mixture as a sticky paste; placing the uncured composite mixture into a mold; and curing the molded composite mixture in an oven at a temperature of about 160° C. to about 185° C. for a time sufficient to form the thermoset mold-casted object.

In accordance with another aspect of the present invention, there is provided a thermoset mold-casted object prepared using a process in accordance with the present invention.

BRIEF DESCRIPTION OF THE FIGURES

FIG. 1 shows a photograph of control formulation Sample 19 (left cast; L) and comparator formulation Sample 20 (right cast; R).

FIG. 2 shows a photograph of control formulation Sample 19 (left cast; L) and comparator formulation Sample 21 (right gas; R).

FIG. 3 shows a photograph of control formulation Sample 19 (left cast; L) and comparator formulation Sample 22 (right cast; R).

FIG. 4 shows a photograph of control formulation Sample 19 (left cast; L) and comparator formulation Sample 23 (right cast; R).

FIG. 5 shows a photograph of control formulation Sample 19 (left cast; L) and comparator formulation Sample 24 (right cast; R).

DETAILED DESCRIPTION OF THE INVENTION

Figure 1:
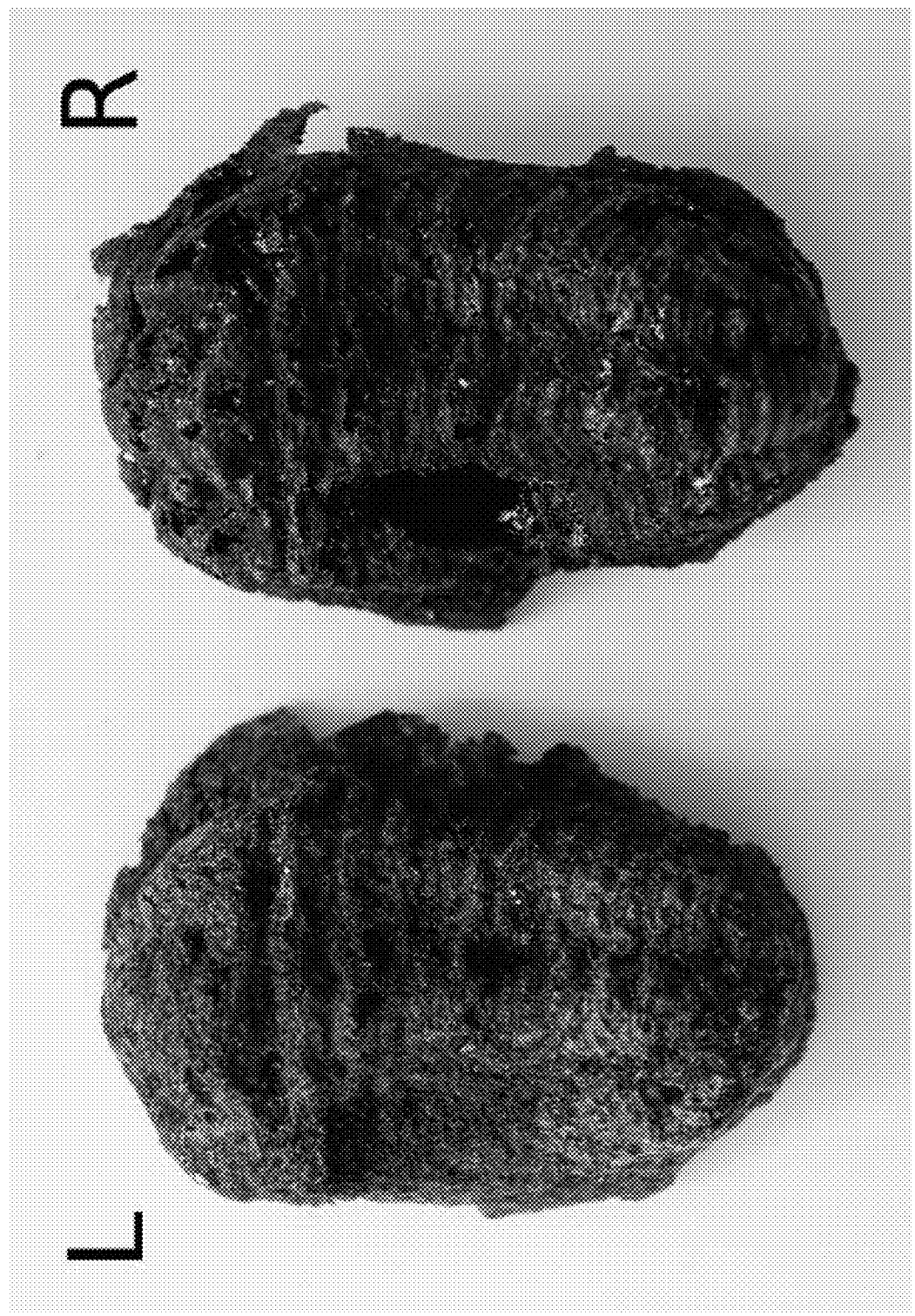
FIGS. 1 to 5 are each photographs of a polymeric mold cast object prepared in accordance with one embodiment of the invention shown on the left, next to a cast object prepared using a comparative formulation shown on the right.

The term "polycondensation reaction", as used in the present disclosure, is used to describe a polymerization reaction between monomer molecules, leading to the release of a small molecule like water, resulting in the formation of higher molecular weight polymers.

The term "polyol", as used in the present disclosure, is used to describe an organic molecule having two or more hydroxyl functional groups.

The term "polycarboxylic acid", as used in the present disclosure, is used to describe an organic molecule having two or more carboxylic acid functional groups.

The term "lignocellulosic material", as used in the present disclosure, is used to define an organic cellulosic material with branching chains and exposed hydroxyl groups, typically derived from plant matter, including but not limited to wood and forestry waste products, straw or agricultural waste products, switchgrass, and other plant based waste materials.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The present invention provides a chitosan-based composition that can be converted into a self-supporting casted object having good tensile and compressive strength that can also biodegrade at the end of its lifecycle. The composition of the present invention comprises entirely bio-based or bio-sourced reagents that can be converted to the final product via a polymerization process that does not require the addition of inorganic catalysts, synthetic materials, or otherwise hazardous chemicals to strengthen or modify its water resistance. The composition is polymerized and cured at an appropriate temperature and for an appropriate period of time to form thermoset polymeric mold-casted solid objects exhibiting a surprising balance of strength without brittleness.

The composition of the present invention comprises chitosan and a combination of a polycarboxylic acid and a polyol. This combination of elements solves the shrinkage issue typically observed with chitosan-based materials by engrafting a polyester formed by a polycondensation reaction between the polycarboxylic acid and polyol onto the chitosan polymer. The natural shrinkage observed with high concentration chitosan materials is offset by the natural material expansion caused by the polycondensation reaction.

Chitosan is a linear polysaccharide with greater than 50% β-(1→4)-linked D-glucosamine units and less than 50% N-acetyl-D-glucosamine units. The chitosan provides significant portion of tensile and compressive strength of final cast material. The ability of chitosan to form a polycationic biopolymer when amino groups are protonated in low pH allows the formation of a paste at a high chitosan concentration. Accordingly, the incorporation of an acidic component in the composition leads to protonation of the amino groups on chitosan and separation of the chitosan chains, allowing the formation of a sticky paste comprising a high concentration of chitosan. The use of the acid component therefore helps to maintain the high strength of the chitosan paste when used. By using a high concentration of chitosan, the resulting composite mixture can be provided as an easily handled paste, thus allowing avoidance of solvent casting processes for forming the final solid product.

In one embodiment, the acidic component in the composition is provided by an organic acid component comprising one or more organic acids. In one embodiment, the one or more organic acids are selected from at least one carboxylic acid, at least one vinylogous acid, and any combination thereof.

In one embodiment, the carboxylic acid comprises at least one lower (e.g., C1-C3) carboxylic acid. In one embodiment, the C1-C3 carboxylic acid component is acetic acid, lactic acid, oxalic acid or a combination thereof.

In one embodiment, one or more organic acids comprise at least one vinylogous acid. The addition of a vinylogous acid or reductone to the composite mixture, also leads to protonation of the amino group on chitosan, while also decreasing the friction/viscosity of the uncured material when handling. In one embodiment, the vinylogous acid is ascorbic acid. The addition of small amounts of ascorbic acid to the composite mixture further decreases the viscosity of the pre-cured material to allow it to better fill spaces in molds and flow better, while also leading to slight reduction in shrinkage during curing. A darkening of the final cured product is also observed, due to oxidation/Maillard reaction.

In one embodiment, the organic acid component comprises a combination of a carboxylic acid and a vinylogous acid. In a preferred embodiment, the organic acid component comprises a combination of acetic acid and ascorbic acid.

In one embodiment, the organic acid component is an aqueous organic acid component. In one embodiment, the organic acid component comprises from about 1.75 to about 2.25 parts acetic acid (10% v/v in water) and from about 0.1 to about 0.5 parts ascorbic acid (10% w/v in water).

The use of chitosan as a component in the present composition also has the benefit of being derivable from multiple sustainable sources, such as fungi and shellfish waste, while also having natural fire-resistant properties, unlike synthetically-produced polymers like polyurethane which require the addition of flame retardants to meet safety regulations.

In one embodiment, the polyester component engrafted onto the chitosan polymer is formed from a polycondensation reaction between a polycarboxylic acid and a polyol.

The opposing expansion of the polyol/polycarboxylic acid polyester formation and shrinkage of the chitosan leads to the formation of a cast product having a stable size. In addition, the formation of ester and amide bonds during the polycondensation reaction with chitosan leads to a final cured product having improved water resistance characteristics.

The polycarboxylic acid contains exposed carboxyl functional groups for polycondensation reaction with the hydroxyl groups of the polyol. The carboxylic acid groups also serve to protonate the amino groups on the chitosan material. In one embodiment, the polycarboxylic acid is citric acid.

The polyol contains exposed hydroxyl functional groups for polycondensation reaction with the carboxyl groups in the polycarboxylic acid component. In one embodiment, the polyol is glycerol. The use of glycerol also decreases the friction/viscosity of the uncured composition during handling, before curing.

The polymerization of glycerol with citric acid contributes to the prevention or reduction of shrinkage of the composite material during the curing process.

Figure 11:
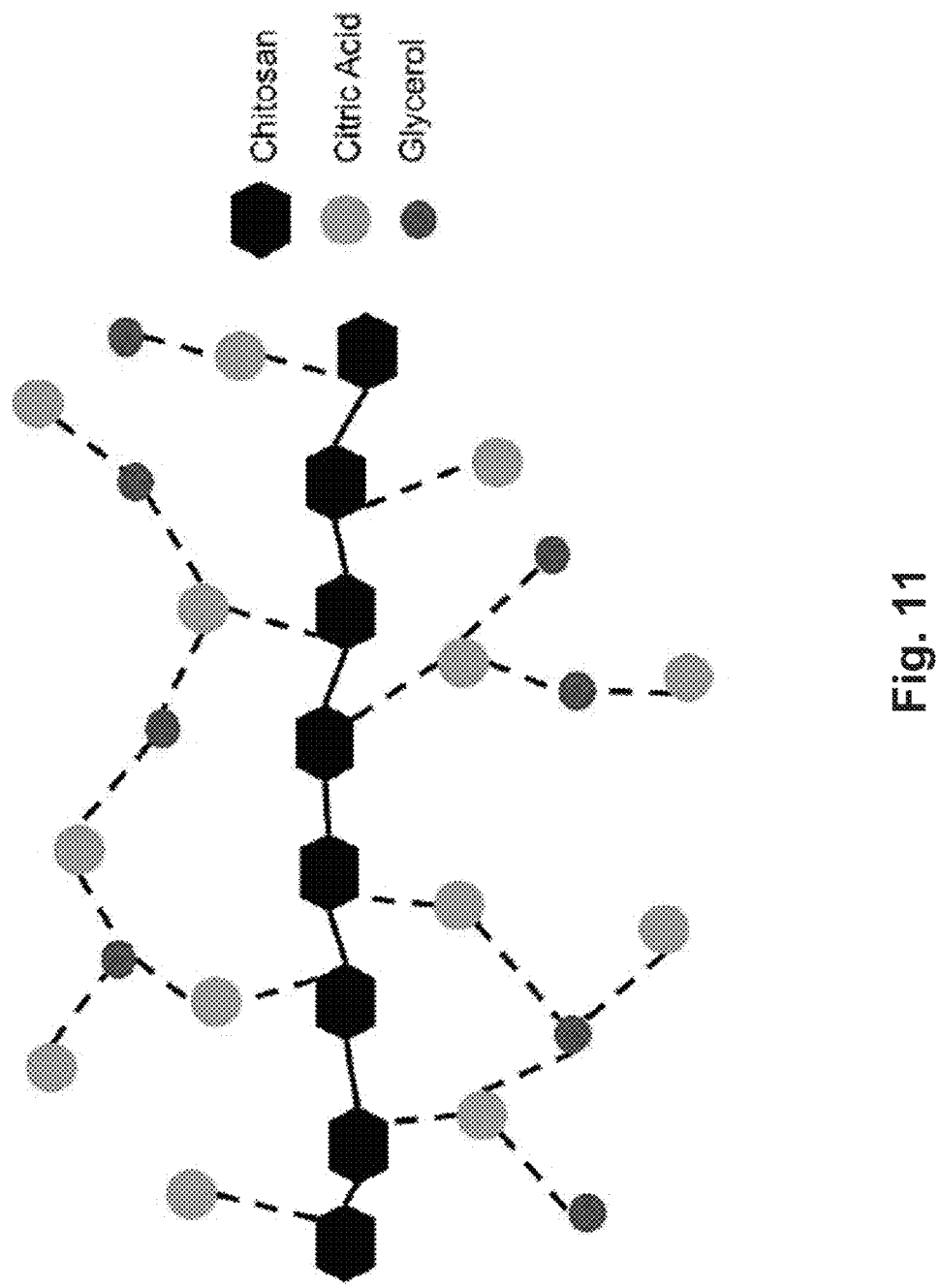
FIG. 11 is a schematic depiction of the proposed molecular structure of the polymerized product resulting from a process in accordance with one embodiment of the present invention.

FIG. 11 depicts the proposed structure of the resulting polymeric product of a reaction between chitosan, glycerol and citric acid, in accordance with one embodiment of the present invention.

In one embodiment, the composition further comprises a powdered lignocellulosic material. The addition of the powdered lignocellulosic material to the composite mixture further suppresses expansion of the cast product due to the steam produced during the polyol/polycarboxylic acid polycondensation reaction. The formation of bubbles during the polycondensation reaction can also be suppressed by using the lignocellulosic material at a high concentration. It is also expected that exposed hydroxyl groups on the lignocellulosic material can also lead to incorporation into the polycondensation reaction. The resulting cast material prepared using a composition that comprises a lignocellulosic component is observed to have increased strength.

The composition of the present invention, comprising the components described herein, has the benefit of not requiring initiators or catalysts to initiate or complete the polymerization reaction, so there are no contaminants (toxic or otherwise) remaining in the final material. All reagents are of low toxicity, and no hazardous chemicals are used. Moreover, as only dilute, weak acids are employed, minimal personal protective equipment (PPE) is required during handling and preparation of the initial mixture.

In addition, each of the components of the composition can be derived from biological sources, so it could replace synthetic materials with similar properties and improve their sustainability.

The curing step of the processes of the present invention can be carried out in an oven at a relatively low temperature, and no dangerous volatiles are released during curing. As such, the processes for making the material do not require the use of a fume-hood or other means for removal of noxious fumes. Only heat-resistant PPE are required when the final cured material is removed from the oven.

The initial uncured composition is an easily handled paste that conforms well to the shape of the molds, while the final casted object retains the shape of the mold without shrinking or expansion. Due to the increased water-resistance of the final material, swelling due to water absorption is reduced. The final cast materials also have the added benefit of being biodegradable over time.

Experimentation with different proportions of the constituent components of the composition and reaction conditions has led to the following observations.

A composition comprising too high a proportion of chitosan results in a tackier pre-cured mixture, and significant amounts of undissolved residue/powder remaining in the final material. A composition comprising too low a proportion of chitosan results in a runnier pre-cured mixture which is difficult to handle, as well as a decrease in the strength of the final material, and more expansion of the final material.

A composition comprising too high a proportion of lignocellulosic material results in less dissolution of the liquid portions of the mixture, leading to a more crumbly material that does not fully fuse together. A composition comprising too low a proportion of lignocellulosic material causes the final material to expand and form air pockets, leading to a weakening of the final product.

A composition comprising too high a proportion of citric acid results in a more brittle final material, as there is not enough glycerol to complete the polymerization reaction. A composition comprising too low a proportion of citric acid results in an oily pre-cured mixture, while also leading to an incomplete polymerization reaction and a weaker, more flexible final material.

A composition comprising too high a proportion of glycerol leads to a decrease in the viscosity of the pre-cured mixture, creating an oily paste, and a more flexible but weaker final material. A composition comprising too low a proportion of glycerol leads to more tackiness and higher viscosity of the pre-cured mixture, while also leading to less polymerization with citric acid, as well as lower strength and more brittleness in the final material.

A composition comprising too high a proportion of ascorbic acid results in increasingly runny, slippery pre-cured material that is difficult to handle, as well as a decrease in the final material strength. A composition comprising too low a proportion of ascorbic acid results in a final material that has increased shrinkage and does not conform as well to the mold shape.

A composition comprising too high a proportion of acetic acid results in increased viscosity of the pre-cured material and no improvement in strength of final material, while lower ranges of acetic acid result in decreasing strength of final material.

A composition comprising too high a proportion of water leads to a runnier pre-cured material, while also requiring more time to cure in the oven. A composition comprising too low a proportion of water leads to a thicker, tackier pre-cured material, as well as the formation of more cracks and decreased detail in the final material.

With respect to the curing process, the following was observed. Higher temperature ranges result in a quicker drying of the chitosan parts of the material, as well as increased shrinkage. In addition, glycerol and citric acid will not fully polymerize before the chitosan portion has greatly reduced its size. Additionally, higher temperature ranges may exceed the upper limit of the temperature tolerance of the silicone molds before they begin to warp. Lower temperature ranges result in an overall slower, incomplete reaction, with significant residual moisture in the final, softer material.

In view of the above observations, the following general formula for the composition of the present invention, in accordance with a preferred embodiment, was determined to provide an optimal balance of good handling characteristics of the uncured composition and the structural and physical characteristics of the final cured polymeric cast product. Amounts are reported as parts by weight:

0.9-1.1 parts chitosan
0.9-1.1 parts powdered lignocellulosic material
1.75-2.25 parts polycarboxylic acid
0.75-1.25 parts polyol
1.3 to 1.9 parts organic acid component;
1-2 parts distilled water The cast-molded materials of the present invention, in accordance with a preferred embodiment, are prepared using the following general process:

The solid components are combined in a mixing vessel with the glycerol component and stirred until the solids are well distributed to form a chalky paste. Distilled water, acetic acid (10% v/v in water) and ascorbic acid (10% w/v in water) are added to the mixing vessel and the resulting mixture is stirred until well-distributed into a sticky paste of the composite mixture. The resulting paste is placed into a heat-resistant silicone mold, and the filled mold is placed in an oven at a temperature of about 160° C. to about 185° C. for at least 3 hours to cure the composite mixture into the final solidified cast molded product. The curing time is increased by approximately an additional hour for each additional 1-2 cm of cast thickness.

The invention will now be described with reference to specific examples. It will be understood that the following examples are intended to describe embodiments of the invention and are not intended to limit the invention in any way.

EXAMPLES

Example 1: Protocol for Small (~15 g) Casted Object

In a mixing vessel, 3 g of finely powdered form of chitosan (~90% degree of deacetylation, ~100 kDa molecular weight), 3 g of wood flour (System Three Resins, Inc., estimated 180-425 um particle size), 6 g of solid citric acid (Food Grade, Milliard, Inc.), and 3 g of 99.7% glycerol (Food Grade, McCall's Bakers, Inc) are combined and mixed until well-distributed into a chalky paste. To this mixture, 5 mL of distilled water, 4 ml of 10% (v/v) acetic acid stock solution in water (Allen's, Inc) and 1 mL of 10% (w/v) ascorbic acid stock solution in water (Sigma-Aldrich), are added, followed by mixing until well-distributed into a sticky paste of the uncured composition. The composite paste is placed into a heat-resistant silicone mold (Silicone Elastomer—Silbione RTV-4420 A/B).

The composition in the mold is placed in an oven (preheated to 175° C.) for 3 hours. The cured cast material is removed from the oven and cooled for 1-2 hours at room temperature. Alternatively, the oven may be turned off and the cast be allowed to remain in the oven overnight while cooling. After complete cooling, the casted object is removed from the mold. Increasing the size of the mold and cast requires additional heating time, estimated to be approximately 1 additional hour for each 1-2 cm of cast depth. The average size of the final casted objects formed according to Example 1 is reported in Table 1.

Example 2: Protocol for Medium (~60 g) Casted Object

In a mixing vessel, 12 g of finely powdered form of chitosan, 12 g of wood flour, 24 g of solid citric acid, and 12 g of 99.7% glycerol are combined and mixed until well-distributed into a chalky paste. To this mixture, 20 mL of distilled water, 16 ml of 10% (v/v) acetic acid stock solution in water and 4 mL of 10% (w/v) ascorbic acid stock solution in water are added, followed by mixing until well-distributed into a sticky paste of the uncured composition. The composite paste is placed into a heat-resistant silicone mold.

The composition in the mold is placed in an oven (preheated to 175° C.) for 5-6 hours, depending on the thickness of the casted object. The cured cast material is removed from the oven and cooled for 1-2 hours at room temperature. Alternatively, the oven may be turned off and the cured cast allowed to remain in the oven and cool overnight. After complete cooling, the casted object is removed from the mold. The average size of the final casted objects formed according to Example 2 is reported in Table 1.

Example 3: Protocol for Large (~150 g) Casted Object

In a mixing vessel, 30 g of finely powdered form of chitosan, 30 g of wood flour, 60 g of solid citric acid, and 30 g of 99.7% glycerol. are combined and mixed until well-distributed into a chalky paste. To this mixture, 50 mL of distilled water, 40 ml of 10% (v/v) acetic acid stock solution in water and 10 mL of 10% (w/v) ascorbic acid stock solution in water are added, followed by mixing until well-distributed into a sticky paste of the uncured composition. The composite paste is placed into a heat-resistant silicone mold.

The composition in the mold is placed in an oven (preheated to 175° C.) for 8-10 hours, depending on the thickness of the casted object. The cured cast material is removed from the oven and cooled for 2-3 hours at room temperature. Alternatively, the oven may be turned off and the cured cast allowed to remain in the oven and cool overnight. After complete cooling, the casted object is removed from the mold. The average size of the final casted objects formed according to Example 3 is reported in Table 1.

TABLE 1

Average dimensions of casts for tensile strength tests and different sized casts (average of 3 replicates, Standard Error in brackets)

| Cast Size | Height (cm) | Width (cm) | Length (cm) | Volume (cm^3) |
| --- | --- | --- | --- | --- |
| Small (Example 1) | 2.77 (0.1764) | 4.67 (0.0333) | 6.63 (0.1202) | 85.64 (6.2938) |
| Medium (Example 2) | 4.23 (0.0333) | 3.58 (0.0969) | 12.07 (0.3527) | 182.57 (5.5241) |
| Large (Example 3) | 2.87 (0.1667) | 5.67 (0.1453) | 20.80 (0.2646) | 337.88 (31.9684) |
| Tensile Test Cast (Examples 4, 5, 6 and 8) | 0.18 (0.0115) | 0.97 (0.0133) | 1.84 (0.0656) | 0.32 (0.0312) |

Figure 6:
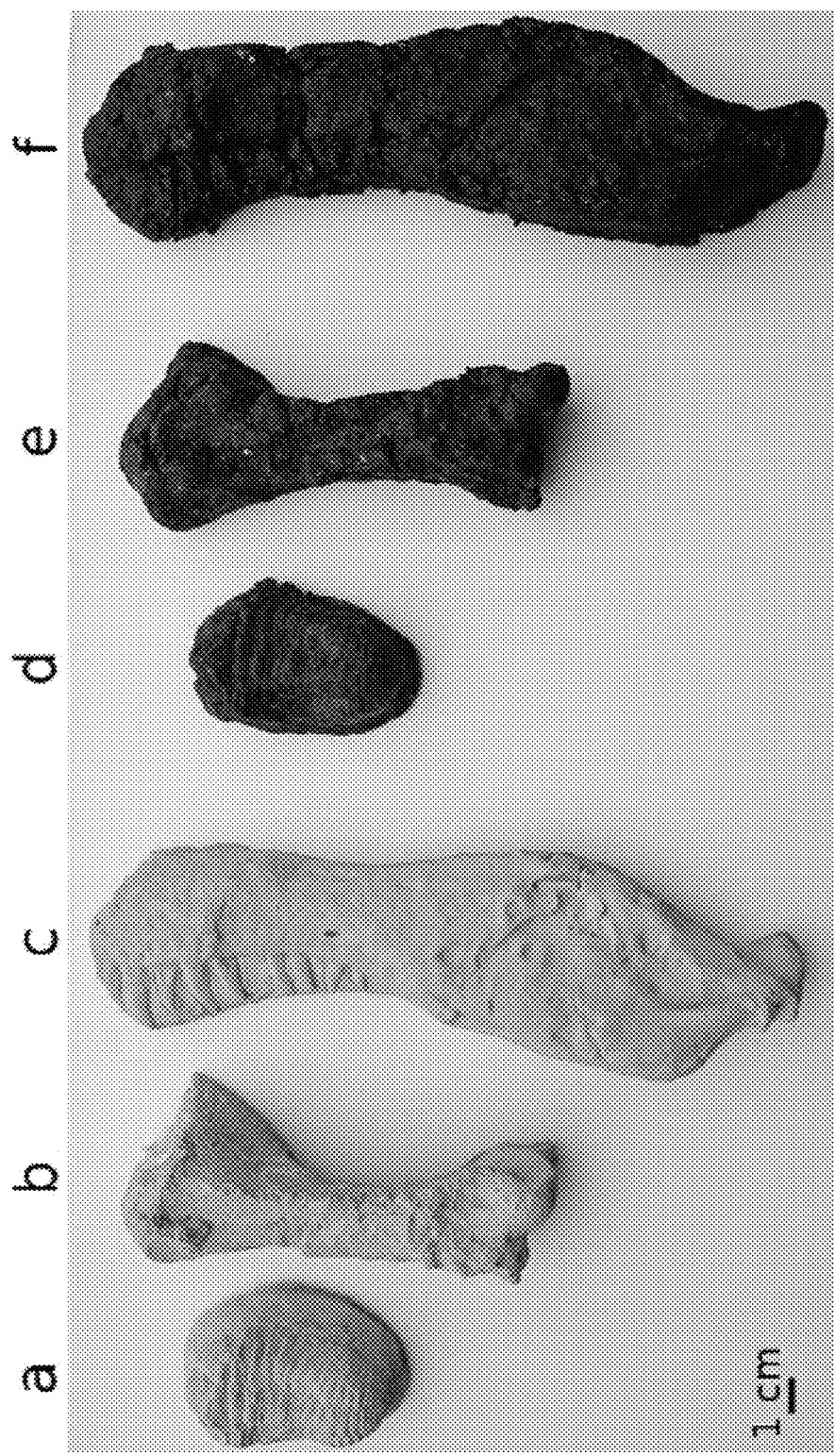
FIG. 6 is a photograph of a selection of polymeric mold cast objects prepared in accordance with one embodiment of the invention.
Figure 7:
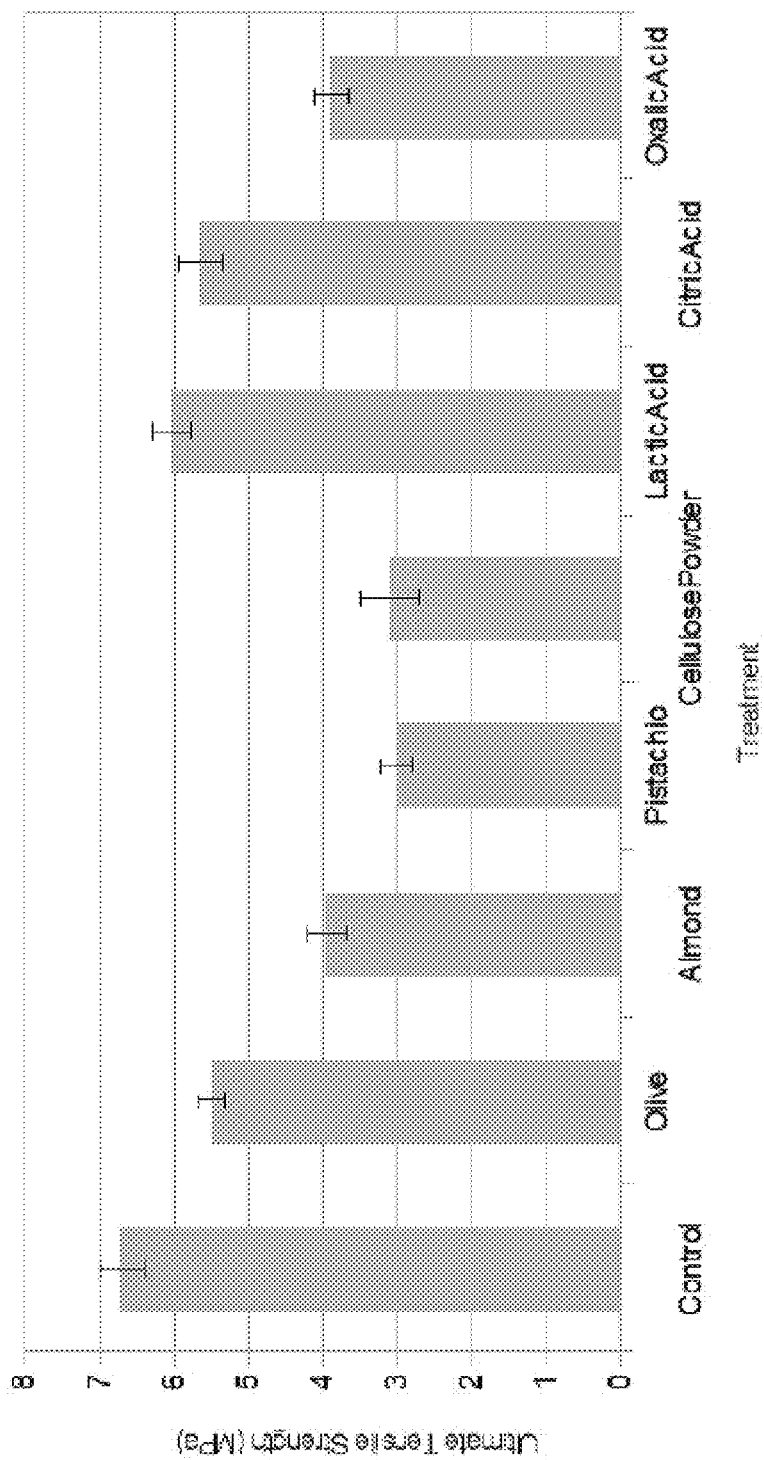
FIG. 7 is a graphical summary of tensile test results for the composite formulations prepared in Example 8.

FIG. 6 provides a visual comparison of examples of different sized casts produced by the protocols described in Examples 1-3. All casts use the formulation as a backfill supporting material; the casts labeled a, b, c use an additional surface layer of plaster of Paris mixture to show mold details, while the casts labeled d, e, f use the same template mold but do not use any additional surface coat materials. Specifically, casts a and d use the Example 1 protocol; casts b and e use the Example 2 protocol; and casts c and f use the Example 2 protocol.

Example 4: Effect of Changes in Amount of Wood Flour on Strength of Final Product The following tensile tests were carried out on a Chatillon—Model LT CM-6 Tensile Tester equipped with a Ametek Chatillon DFX2-200 Digital Force Gauge. All samples were held between two G1062 Miniature Wedge Grips. Tensile strength measures were calculated using the force value recorded on the tensile gauge's display at the point of fracture.

A series of composite formulations were prepared using the protocol described in Example 1, with the exception that the material was divided into 24 rectangular-shaped molds with the dimensions found in Table 1 in the 'Tensile Test Cast' row. In addition, this experiment modified the formulation so that the relative proportion of wood flour was varied in each treatment (4 treatments consisting of 6 replicates each). The amount of wood flour is reported relative to the amount of wood flour in the formulation described in Example 1. The results of the tensile strength tests for the resulting samples are presented in Table 2. It was observed that a higher proportion of wood flour correlated to higher tensile strength in the final cured product. It was also observed that Formulation 1, which contained the highest proportion of wood flour, provided a very 'chalky' and clumpy uncured material, which was difficult to smooth out and did not fill spaces in the mold well.

TABLE 2

| Formulation | % Wood Flour | Average Tensile Strength (MPa) | Standard Error |
| --- | --- | --- | --- |
| 1 | 133.3 | 6.7969 | 1.2665 |
| 2 | 100 | 4.9020 | 1.1171 |
| 3 | 66.7 | 4.8080 | 0.6346 |
| 4 | 33.3 | 2.5048 | 0.5748 |

A second series of composite formulations were prepared using the protocol described in Example 4, again varying the relative proportion of wood flour. The results of the tensile strength tests for this example are presented in Table 3. Although it was observed that increasing the proportion of wood flour correlated generally to higher tensile strength in the final cured product, this beneficial effect eventually leveled off and appeared to decrease with the inclusion of very high proportions of wood flour (Formulation 8). It was again observed that formulations containing high proportions of wood flour provided 'chalky' and clumpy uncured materials, which were difficult to handle and did not fill spaces in the mold well.

TABLE 3

| Formulation | % Wood Flour | Average Tensile Strength (MPa) | Standard Error |
| --- | --- | --- | --- |
| 5 | 100 | 4.4865 | 0.7069 |
| 6 | 113.3 | 5.0444 | 0.5924 |
| 7 | 133.3 | 5.2152 | 0.3903 |
| 8 | 166.7 | 4.7770 | 0.8074 |

The mean size of the final casted objects for Formulations 1 to 8 formed according to Example 4 is reported in Table 1.

Example 5: Effect of Water Exposure on Strength of Cast Product

A series of composite formulations were prepared using the protocol described in Example 4, with the exception that the wood flour was replaced with ground olive pit (<50 μm particle size). After curing for 3 hours at 175° C., samples were divided into 4 groups, each subjected to different treatment conditions (6 replicates per treatment) to test the effects of water immersion on tensile strength.
  (a) Treatment A: Formulation 9 served as control for Formulation 10, and was kept dry for 3 hours until tested for tensile strength.
  (b) Treatment B: Formulation 10 was immediately immersed in room temperature distilled water for 1.5 hours, then removed from the water, allowed to air dry for 1.5 hours, and then tested for tensile strength alongside Formulation 9.

The results of the tensile strength tests for this example are presented in Table 4. It is apparent from this series of experiments that although the tensile strength may be reduced when water is added, the material's strength isn't completely compromised after being wet for a period of time (despite chitosan being hydrophilic on its own, and the fact that water would be expected to break down the polyester bonds in the glycerol-citric acid polymer). It may also be concluded that the glycerol-citric acid polymerization reduces the hydrophilic nature of chitosan. The average size of the final casted objects for Formulations 9 and 10 formed according to Example 5 is reported in Table 1. Tensile strength measures were calculated using the force value recorded on the tensile gauge's display at the point of fracture.

TABLE 4

| Formulation | Water treatment | Average Tensile Strength (MPa) | Standard Error |
| --- | --- | --- | --- |
| 9 | A | 4.3236 | 0.6413 |
| 10 | B | 2.4594 | 1.1335 |

Example 6: Effect of Mixture of Lignocellulosic Material on Morphology of Final Product A series of composite formulations were prepared using the protocol described in Example 4 with the modification that a proportion of ground olive pit was further added. The amount of added ground olive pit is reported relative to the amount of wood flour present. The proportions of ground olive pit in each formulation are presented in Table 5. Less pitting and cracking on the surfaces of the final cured product was observed with increasing proportions of ground olive pit, however, the surfaces were still not smooth. The average size of the final casted objects for Samples 11 to 15 formed according to Example 6 is reported in Table 1.

TABLE 5

| Sample | % Ground Olive Pit |
| --- | --- |
| 11 | 0 |
| 12 | 25 |
| 13 | 50 |
| 14 | 75 |
| 15 | 125 |

Example 7: Effect of Varying Amounts of Acetic and Ascorbic Acids

A series of composite formulations were prepared using the protocol described in Example 4, with the exception that the relative amounts of acetic acid and ascorbic acid stock solutions in water were varied. The results of the tensile strength tests for this example are presented in Table 6. It was observed that Formulations 16 and 17 produce final cured products having similar tensile strength characteristics. Formulation 18 was observed to produce a final cured product having some warping and shrinkage, as well as slightly lighter coloration. In addition, while Formulations 16 and 17 are similar for strength, the increased proportion of ascorbic acid in Formulation 17 resulted in a 'runnier' uncured composition, without significantly affecting the strength. The average size of the final casted objects for Formulations 16 to 18 formed according to Example 7 is reported in Table 1.

TABLE 6

| Sample | Acetic Acid (10% v/v) | Ascorbic Acid (10% w/v) | Average Tensile Strength (MPa) | Standard Error |
| --- | --- | --- | --- | --- |
| 16 | 4 ml | 1 ml | 6.2086 | 0.4354 |
| 17 | — | 5 ml | 6.4675 | 0.6846 |
| 18 | 5 ml | — | 5.4045 | 0.9813 |

Example 7: Effect of Changes in Formulation on Morphology of Final Casted Product A series of composite formulations were prepared using the general protocol described in Example 1, with additional treatments omitting specific reagents in order to prepare comparative examples with the final formulation. The formulations are described in Table 7.

TABLE 2

| Sample | Chitosan (g) | Acetic Acid, 10% v/v (ml) | Ascorbic Acid, 10% w/v (ml) | Distilled Water (ml) | Glycerol (g) | Powdered Citric Acid (g) | Wood Flour (g) |
| --- | --- | --- | --- | --- | --- | --- | --- |
| 19 (control) | 3 | 4 | 1 | 5 | 3 | 6 | 3 |
| 20 | 3 | 4 | 1 | 5 | 3 | 6 | 0 |
| 21 | 0 | 4 | 1 | 5 | 3 | 6 | 3 |
| 22 | 3 | 4 | 1 | 0 | 3 | 6 | 3 |
| 23 | 3 | 0 | 0 | 5 | 3 | 6 | 3 |
| 24 | 3 | 4 | 1 | 5 | 0 | 0 | 3 |

FIGS. 1 to 5 provide a visual comparison between a casted object prepared from a control formulation (Sample 19) and a series of casted objects prepared using comparator formulations in which a reagent from the control formulation has been omitted. Each casted object is a replica trilobite fossil with dimensions corresponding to the "small' experiment in Table 1.

FIG. 1; Sample 19 (left cast; L) and Sample 20 (right cast; R). Visual comparison between casts using the control formulation Sample 19 (L) and comparator formulation Sample 20 without wood flour (R). Sample 20 has noticeable darkening, and has increased adhesion to the mold after curing. After removing from the mold, there is hardened residue that remains behind. While areas of the cast surface of Sample 20 have improved detail over Sample 19, the outer skin is thin and easily punctured, revealing large air pockets just below the surface.

Figure 2:

FIG. 2; Sample 19 (left cast; L) and Sample 21 (right cast; R). Visual comparison between casts using the control formulation Sample 19 (L) and comparator formulation Sample 21 without chitosan (R). Sample 21 has reddish coloration and a 'pock-marked', bubbly surface. In addition, the final material for Sample 21 feels more brittle than Sample 19.

Figure 3:

FIG. 3; Sample 19 (left cast; L) and Sample 22 (right cast; R). Visual comparison between casts using the control formulation Sample 19 (L) and comparator formulation Sample 22 without water (R). Sample 22 has lighter coloration with rougher, less-detailed surface than Sample 19.

Figure 4:

FIG. 4; Sample 19 (left cast; L) and Sample 23 (right cast; R). Visual comparison between casts using the control formulation Sample 19 (L) and comparator formulation Sample 23 without acetic and ascorbic acid (R). Sample 23 resembles the result from FIG. 3, with an even lighter coloration and a rougher surface. There is some minor shrinkage, and fragments of wood flour crumble away with minimal handling.

Figure 5:
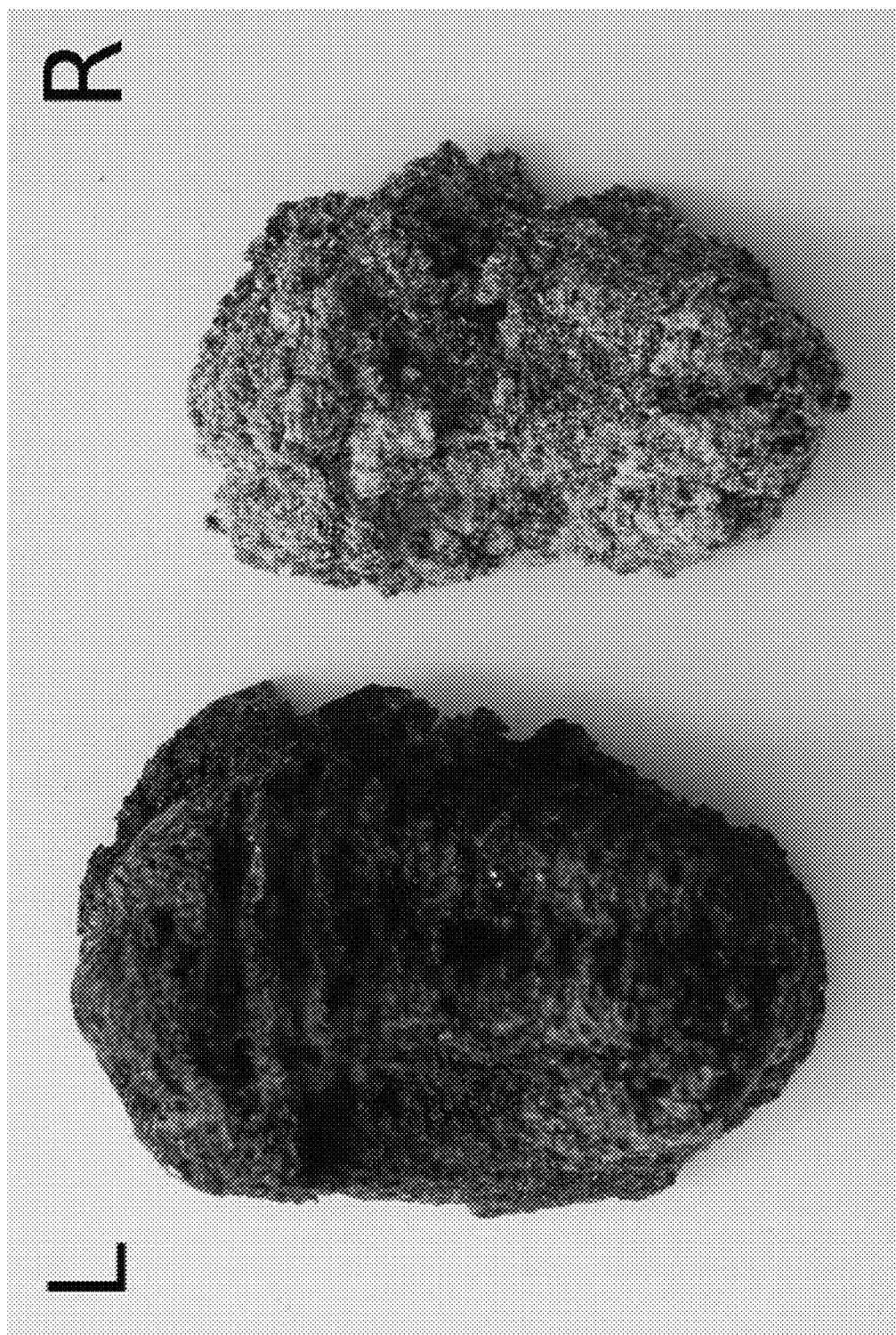

FIG. 5; Sample 19 (left cast; L) and Sample 24 (right cast; R). Visual comparison between casts using the control formulation Sample 19 (L) and comparator formulation Sample 24 without glycerol and citric acid (R). Sample 24 exhibits major shrinkage, with very light coloration and almost no detail on surface. The material of Sample 24 crumbles away easily.

Example 8: Tensile Strength of Composite Formulations with Varying Acid and Lignocellulosic Components Composite formulations were prepared using the protocol described in Example 1, with formulations comprising a different acid reagent or lignocellulose material at the same quantity or volume. For Formulations 25 to 29, 4 ml acetic acid stock solution (Table 8; Acid 1) and 1 ml ascorbic acid stock solution (Table 8; Acid 2) were used; for Formulations 30 to 32, 5 ml of the acid stock solution was used (Table 8; Acid 1 only). The acid stock solutions employed were acetic acid (10% v/v), ascorbic acid (10% w/v), lactic acid (10% v/v), citric acid (10% w/v) and oxalic acid (10% w/v), all in water. 3 g of lignocellulose material was used for all formulations. There were multiple replicates per formulation, with each test cast having the dimensions described in Table 1. After curing, composites were cooled and then tested for strength after 4 days at room temperature. Tensile strength measures were calculated using the force value recorded on the tensile gauge's display at the point of fracture. Visually, all cured composites looked similar. The composite formulations and results of the tensile strength tests for this example are presented in Table 8. Acetic

TABLE 8

| Formulation | Lignocellulosic Material | Acid 1 | Acid 2 | Average Tensile Strength | Standard Error |
|---|---|---|---|---|---|
| 25 (n = 8) | Wood Flour | Acetic | Ascorbic | 6.707 | 0.590 |
| 26 (n = 5) | Olive | Acetic | Ascorbic | 5.500 | 0.364 |
| 27 (n = 6) | Almond | Acetic | Ascorbic | 3.953 | 0.518 |
| 28 (n = 5) | Pistachio | Acetic | Ascorbic | 3.012 | 0.438 |
| 29 (n = 4) | Cellulose Powder | Acetic | Ascorbic | 3.102 | 0.801 |
| 30 (n = 6) | Wood Flour | Lactic | None | 6.030 | 0.533 |
| 31 (n = 6) | Wood Flour | Citric | None | 5.635 | 0.594 |
| 32 (n = 6) | Wood Flour | Oxalic | None | 3.890 | 0.438 |

It appears from this experiment that the formulation comprising wood flour as the lignocellulose reagent and acetic acid/ascorbic acid as the organic acid component provided a casted object having the highest tensile strength. All other treatments were functional but had reduced strength. The wood flour has a larger particle size than the other lignocellulosic materials, suggesting that there may be some mechanical benefit related to the dimensions or shape of the particles in addition to their molecular properties.

Example 9: Tensile Strength Testing of "Dogbone"-Style Cast Product

Figure 9:
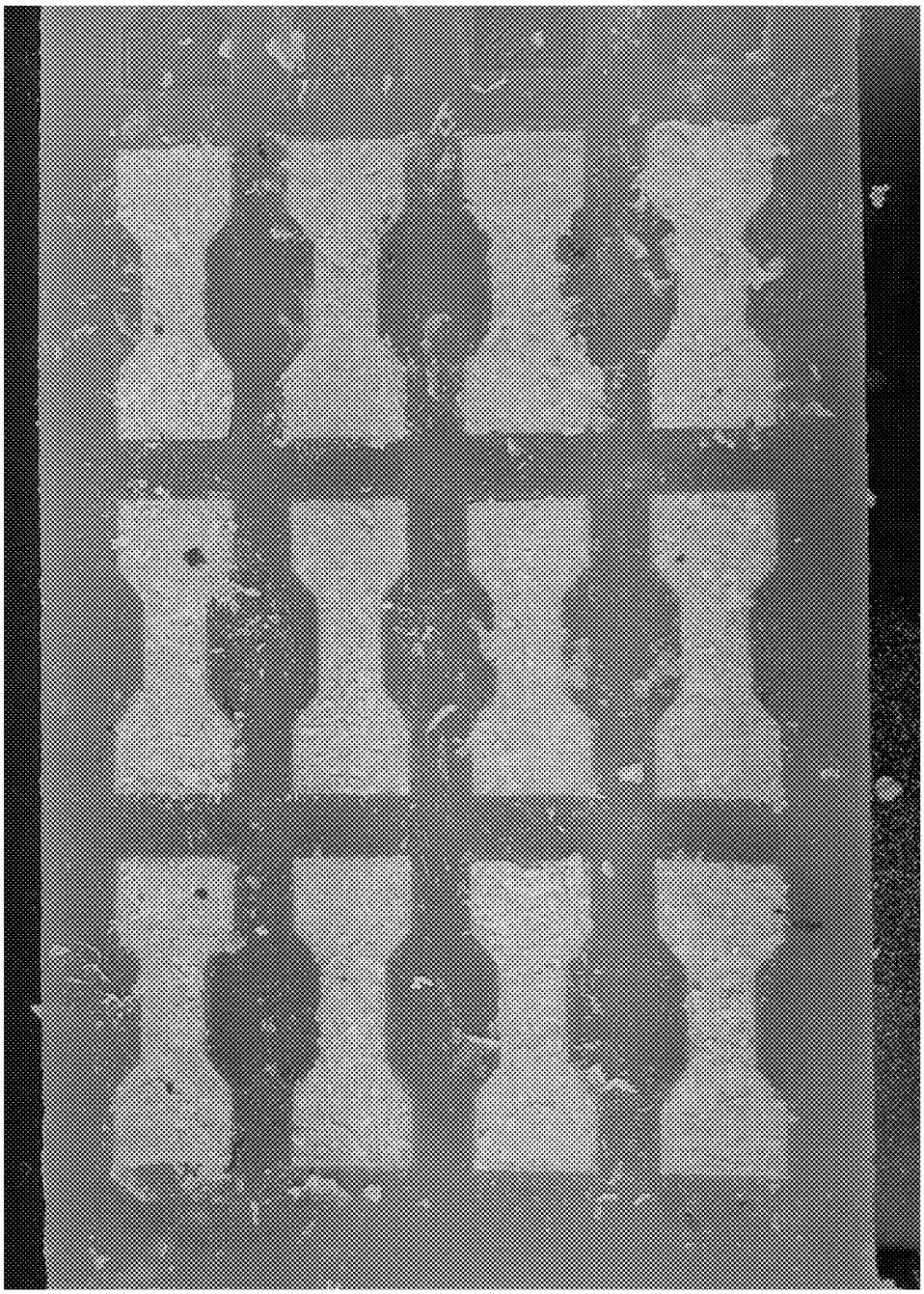
FIG. 9 is a photograph of "dogbone' polymeric mold cast objects in the mold prior to curing, prepared in accordance with one embodiment of the invention.
Figure 10:
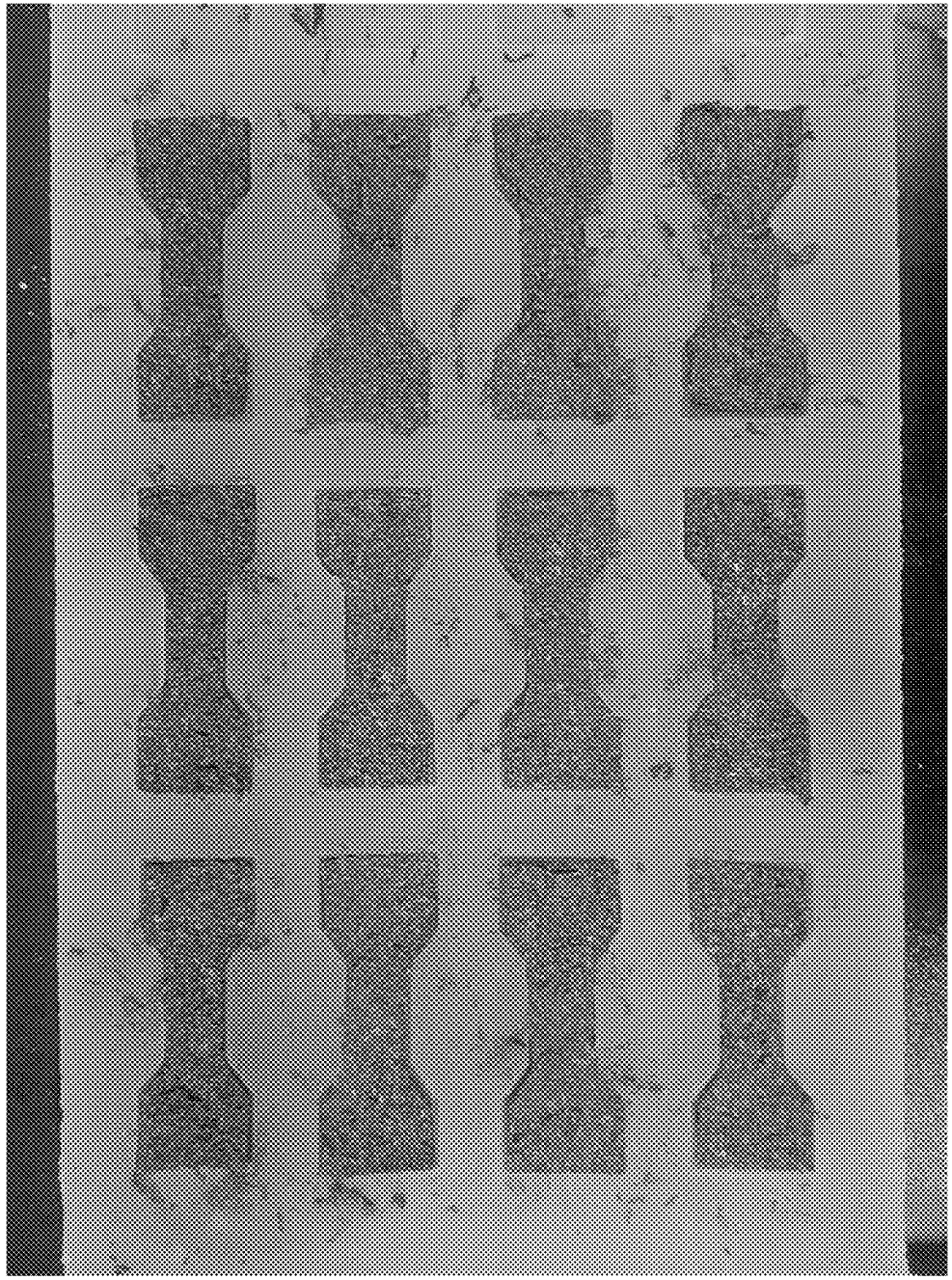
FIG. 10 is a photograph of "dogbone' polymeric mold cast objects in the mold after curing, prepared in accordance with one embodiment of the invention.

The composition described in Example 1 was used to fill 12 cavities in the mold prepared in Example 10, as shown in FIG. 9. The filled mold was then placed into an oven at 175° C. for 2.5 hours. These samples were allowed to cool overnight, removed from the oven the following day to provide the cured casts as shown in FIG. 10, of which 6 were then randomly selected for tensile testing according to the testing protocol described in Example 4. The average tensile strength test results from these samples are summarized in Table 9 (average of 6 replicates).

TABLE 9

| | Average Tensile Strength (MPa) | Standard Deviation | Standard Error |
|---|---|---|---|
| Average 'Dogbone' Cast | 6.431 | 1.489 | 0.608 |

Figure 8:
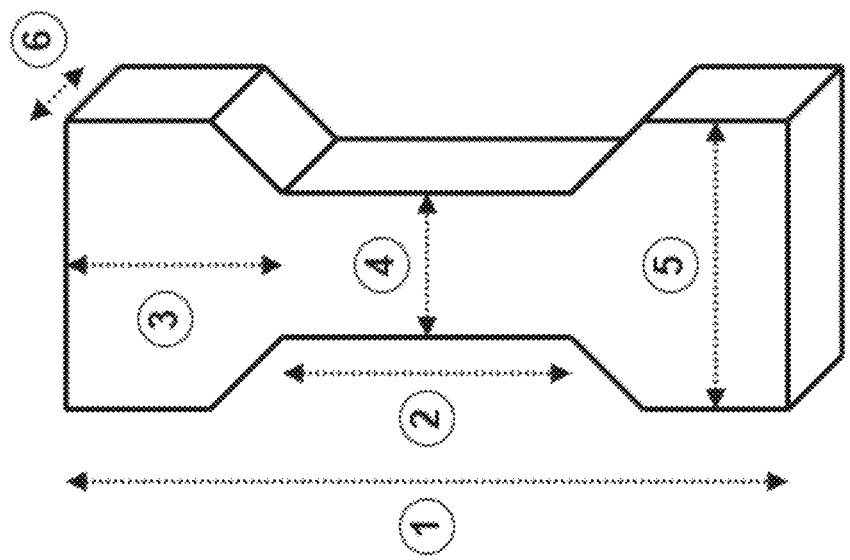
FIG. 8 is a schematic depiction of "dogbone" tensile testing samples, in accordance with one embodiment of the invention.

Example 10: Formation of "Dogbone"-Style Molds 3D templates having a "dogbone" shape were designed in zBrush software (Pixologic Inc.) having the general shape as schematically shown in FIG. 8. These templates were then 3D printed using polylactic acid filament on an Ender 3 V2 filament deposition modeling printer (Creality). Multiple samples were printed and then molded in a block series using heat-resistant silicone rubber to prepare a mold for the simultaneous formation of multiple casts. The average dimensions of the "dogbone"-style casts produced in Example 9 using these molds are summarized in Table 10 (average of 4 replicates, standard error in brackets).

TABLE 10

| | Axis 1 | Axis 2 | Axis 3 | Axis 4 | Axis 5 | Axis 6 |
|---|---|---|---|---|---|---|
| Average 'Dogbone' Cast Axis Length (mm) | 44.98 (0.578) | 15.37 (0.411) | 14.96 (0.402) | 9.01 (0.038) | 17.22 (0.090) | 2.17 (0.173) |

It is apparent that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A composition for use in preparing a thermoset mold-casted object, the composition comprising:
   from about 0.9 to about 1.1 parts chitosan;
   from about 0.9 to about 1.1 parts powdered lignocellulosic material;
   from about 1.75 to about 2.25 parts polycarboxylic acid;
   from about 0.75 to about 1.25 parts polyol;

from about 1.3 to about 1.9 parts of an organic acid component; and from about 1 to about 2 parts water.

2. The composition of claim 1, wherein the powdered lignocellulosic material is selected from the group consisting of wood flour, powdered olive pits, powdered straw, powdered switchgrass, and any combination thereof.

3. The composition of claim 2, wherein the organic acid component comprises one or more organic acids selected from the group consisting of at least one C1-C3 carboxylic acid, at least one vinylogous acid, and any combination thereof, wherein the organic acid component is optionally an aqueous organic acid component.

4. The composition of claim 3, wherein the vinylogous acid is ascorbic acid, and/or the C1-C3 carboxylic acid is acetic acid.

5. The composition of claim 4, wherein the organic acid component comprises from about 1.75 to about 2.25 parts acetic acid (10% v/v in water) and from about 0.1 to about 0.5 parts ascorbic acid (10% w/v in water).

6. The composition of claim 5, wherein the polyol is glycerol.

7. The composition of claim 6, wherein the polycarboxylic acid is a tricarboxylic acid.

8. The composition of claim 7, wherein the tricarboxylic acid is citric acid.

9. The composition of claim 1, wherein the composition comprises:
about 1 part chitosan;
about 1 part wood flour;
about 2 parts citric acid;
about 1 part glycerol;
about 0.3 parts 10% w/v ascorbic acid in water;
about 1.3 parts 10% v/v acetic acid in water; and
about 1.6 parts water.

10. A process for preparing a thermoset mold-casted object, comprising the steps:
providing a mixture comprising from about 0.9 to about 1.1 parts chitosan, from about 0.9 to about 1.1 parts powdered lignocellulosic material, from about 1.75 to about 2.25 parts polycarboxylic acid, and from about 0.75 to about 1.25 parts polyol;
stirring the mixture until a paste is formed;
adding from about 1 to about 2 parts distilled water, and from about 1.3 to about 1.9 parts of an organic acid component to the paste mixture;
stirring the resulting mixture to form an uncured composite mixture as a sticky paste;
placing the uncured composite mixture into a mold; and
curing the molded composite mixture in an oven at a temperature of about 160° C. to about 185° C. for a time sufficient to form the thermoset mold-casted object.

11. The process of claim 10, wherein the powdered lignocellulosic material is selected from the group consisting of wood flour, powdered olive pits, powdered straw, powdered switchgrass, and any combination thereof.

12. The process of claim 11, wherein the organic acid component comprises one or more organic acids selected from the group consisting of at least one C1-C3 carboxylic acid, at least one vinylogous acid, and any combination thereof, wherein the organic acid component is optionally an aqueous organic acid component.

13. The process of claim 12, wherein the vinylogous acid is ascorbic acid and/or the C1-C3 carboxylic acid is acetic acid.

14. The process of claim 13, wherein the organic acid component comprises from about 1.75 to about 2.25 parts acetic acid (10% v/v in water) and from about 0.1 to about 0.5 parts ascorbic acid (10% w/v in water).

15. The process of claim 14, wherein the polyol is glycerol.

16. The process of claim 15, wherein the polycarboxylic acid is a tricarboxylic acid.

17. The process of claim 16, wherein the tricarboxylic acid is citric acid.

18. The process of claim 10, wherein the molded composite mixture is cured for at least 3 hours and the curing step takes place at a temperature of about 175° C.

19. The process of claim 17, wherein the molded composite mixture is cured for at least 3 hours and the curing step takes place at a temperature of about 175° C.

20. A thermoset mold-casted object prepared using the process as defined in claim 10.

* * * * *